US009176687B2

(12) United States Patent
Seki

(10) Patent No.: US 9,176,687 B2
(45) Date of Patent: Nov. 3, 2015

(54) IMAGE FORMING APPARATUS AND COMMUNICATION METHOD

(71) Applicant: CANON KABUSHIKI KAISHA, Tokyo (JP)

(72) Inventor: Hirotaka Seki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/892,911

(22) Filed: May 13, 2013

(65) Prior Publication Data

US 2014/0009785 A1 Jan. 9, 2014

(30) Foreign Application Priority Data

Jul. 9, 2012 (JP) ................................ 2012-153692

(51) Int. Cl.
*G06F 3/12* (2006.01)
*G03G 21/14* (2006.01)

(52) U.S. Cl.
CPC .............. *G06F 3/1211* (2013.01); *G03G 21/14* (2013.01)

(58) Field of Classification Search
CPC ..................................................... G06F 3/1211
USPC ................................ 358/468, 1.15, 1.9, 1.16
See application file for complete search history.

(56) References Cited

U.S. PATENT DOCUMENTS

| | | | |
|---|---|---|---|
| 4,170,791 A | 10/1979 | Daughton et al. | 364/900 |
| 5,278,958 A * | 1/1994 | Dewa | 710/16 |
| 5,859,956 A * | 1/1999 | Sugiyama et al. | 358/1.13 |
| 5,898,666 A | 4/1999 | Fukuda | 370/280 |
| 2010/0231962 A1* | 9/2010 | Sakai et al. | 358/1.15 |
| 2014/0281133 A1* | 9/2014 | Karamcheti et al. | 711/103 |

FOREIGN PATENT DOCUMENTS

| | | | |
|---|---|---|---|
| CN | 101 833 261 A | 9/2010 | G03G 15/00 |
| JP | 2007-147906 | 4/2007 | |
| JP | 4748788 | 8/2011 | |

OTHER PUBLICATIONS

Office Action dated May 27, 2015 in CN Application No. 2013-10231162.1.

* cited by examiner

*Primary Examiner* — Jerome Grant, II
(74) *Attorney, Agent, or Firm* — Fitzpatrick, Cella, Harper & Scinto

(57) ABSTRACT

An image forming apparatus that executes processes necessary for image formation in a distributed manner. An image forming module (304) executes a process assigned by a sub master control unit (330) and a slave control unit (331) which are connected to each other by a pair of serial communication buses (380*tx*, 380*rx*). The sub master control unit (330) transmits first data for executing a process assigned to the slave control unit (331) via the serial communication bus (380*tx*). The slave control unit (331) transmits second data to the sub master control unit (330) via the serial communication bus (380*rx*) in a period during which the slave control unit (331) does not receive the first data.

11 Claims, 8 Drawing Sheets

IMAGE FORMING APPARATUS AND COMMUNICATION METHOD

BACKGROUND OF THE INVENTION

1. Field of the Invention

The present invention relates to an image forming apparatus that controls image formation using a first control unit and a second control unit connected to a load.

2. Description of the Related Art

An image forming apparatus using electrophotography includes functions for image formation, such as a conveying function to convey a recording material such as a sheet, an image forming function to generate an image, and a fixing function to fix an image on the recording material. When those functions are controlled by a single central processing unit (CPU), the processing load of the CPU increases, thus making the overall processing slow. In addition, arrangement of wiring from the CPU to a board where an actuator such as a motor is connected becomes complicated. Therefore, it is desired to execute distributed control on the operation of the image forming apparatus by using a plurality of control modules that achieve those functions. Each control module includes a CPU which executes a process for the associated function (hereinafter referred to as "sub CPU").

Serial communication is used for transmission and reception of data between the sub CPUs of a plurality of control modules. Each control module controls a load driver such as a motor driver by using the sub CPU incorporated in the control module. An increase in the number of load drivers which the sub CPU controls increases the data communication traffic in serial communication.

U.S. Pat. No. 5,898,666 describes an apparatus that changes the communication rate between the upstream direction and the downstream direction in serial communication.

Japanese Patent No. 4748788 describes an apparatus in which a dedicated line is provided to an optional device in addition to the serial transmission lines.

The known structures to achieve serial communication of an image forming apparatus include a structure which uses two lines of a transmission line and a reception line, a structure which uses two lines of a clock line and a transmission/reception line, or which uses three lines of a clock line, a transmission line, and a reception line. Because an image forming apparatus needs to sheets without jamming, a control sequence for controlling sheet conveying is extremely important. In the case of conveying a recording material such as a sheet of paper, it is necessary to first determine the speed of a motor for conveying the recording material, and then start rotating the motor. However, when serial communication for determining the motor speed is not established due to noise or the like and the motor speed is not determined, serial communication for starting the rotation of the motor may be established before the motor speed is determined. In this case, the motor cannot be rotated at the proper speed, and jamming or the like occurs. To cope with this problem, conventionally, after confirmation of reliable establishment of serial communication, the next communication is started every time. Executing serial communication in this way can permit the control sequence to be executed normally, thus ensuring a proper image forming operation. In order to properly execute the control sequence for the image forming operation, as described above, it is important to check whether or not the communication is established.

In addition, in order to properly execute the control sequence for the image forming operation, information needs to be acquired regularly. In order to control transportation of a recording material with high precision, for example, it is necessary to regularly acquire the output result of a sensor which detects the conveying state of the recording material.

In this case, if communication for checking whether or not communication is established to regularly acquire the information is delayed, control on the image forming operation may not be executed properly.

SUMMARY OF THE INVENTION

In order to solve the above-mentioned problem, there is provided an image forming apparatus, comprising: a first control unit; and a second control unit that is connected to load, and is configured to control the load based on an instruction from the first control unit; a first communication line configured to transmit data from the first control unit to the second control unit; and a second communication line configured to transmit data from the second control unit to the first control unit. The second control unit comprises: a holding unit configured to hold data; and a processor configured to transmit a return to the first control unit by using the second communication line when receiving the instruction from the first control unit via the first communication line, and is configured to transmit the data held in the holding unit to the first control unit based on a set period by using the second communication line. The processor is configured to delay a timing for transmitting the data held in the holding unit so that the transmission of the data held in the holding unit is prevented from overlapping the transmission of the return, based on a state of the reception of the instruction from the first control unit via the first communication line and a state of the return using the second communication line at the timing for transmitting the data held in the holding unit based on the set period.

Further features of the present invention will become apparent from the following description of exemplary embodiments (with reference to the attached drawings).

DESCRIPTION OF THE EMBODIMENTS

In the following, an embodiment is described in detail referring to the accompanying drawings.

Figure 1:
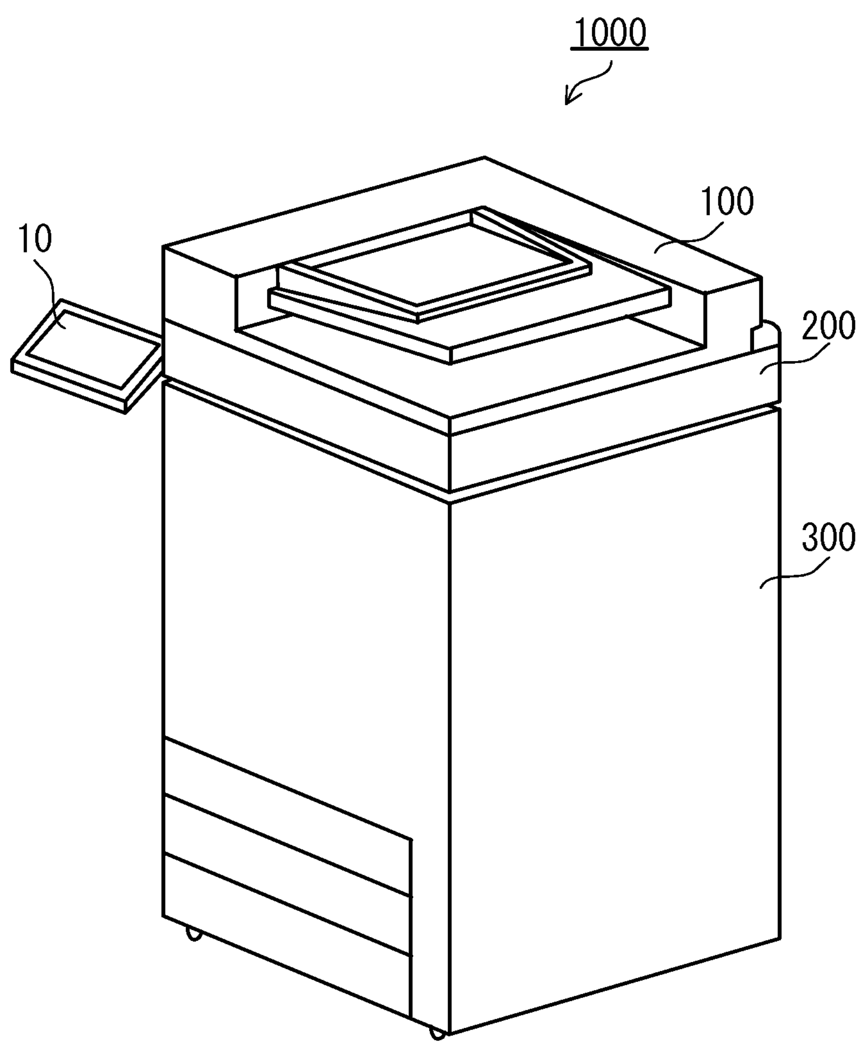
FIG. 1 is a schematic perspective view of an image forming apparatus.

FIG. 1 is a schematic perspective view of an image forming apparatus 1000 to which a serial communication apparatus according to this embodiment is applied.

The image forming apparatus 1000 includes an auto document feeder (ADF) 100, an image scanner 200, an image forming unit 300, and an operation unit 10. The image scanner 200 is provided on the image forming unit 300. The ADF 100 is mounted on the image scanner 200. Those components of the image forming apparatus 1000 are controlled in a distributed manner by a plurality of control units. A CPU, a dedicated semiconductor device, or the like can be used for each control unit.

The ADF 100 automatically conveys a document onto a platen glass. The image scanner 200 scans the document conveyed from the ADF 100, and outputs image data. The image forming unit 300 forms an image, on a recording material such as paper, based on the image data output from the image scanner 200 or image data input from an external device over a network. The operation unit 10 has a graphical user interface (GUI) for allowing a user to perform various operations. The operation unit 10 has a display equipped with, for example, a touch panel, so as to be able to display information to the user.

(Image Forming Unit)

Figure 2:
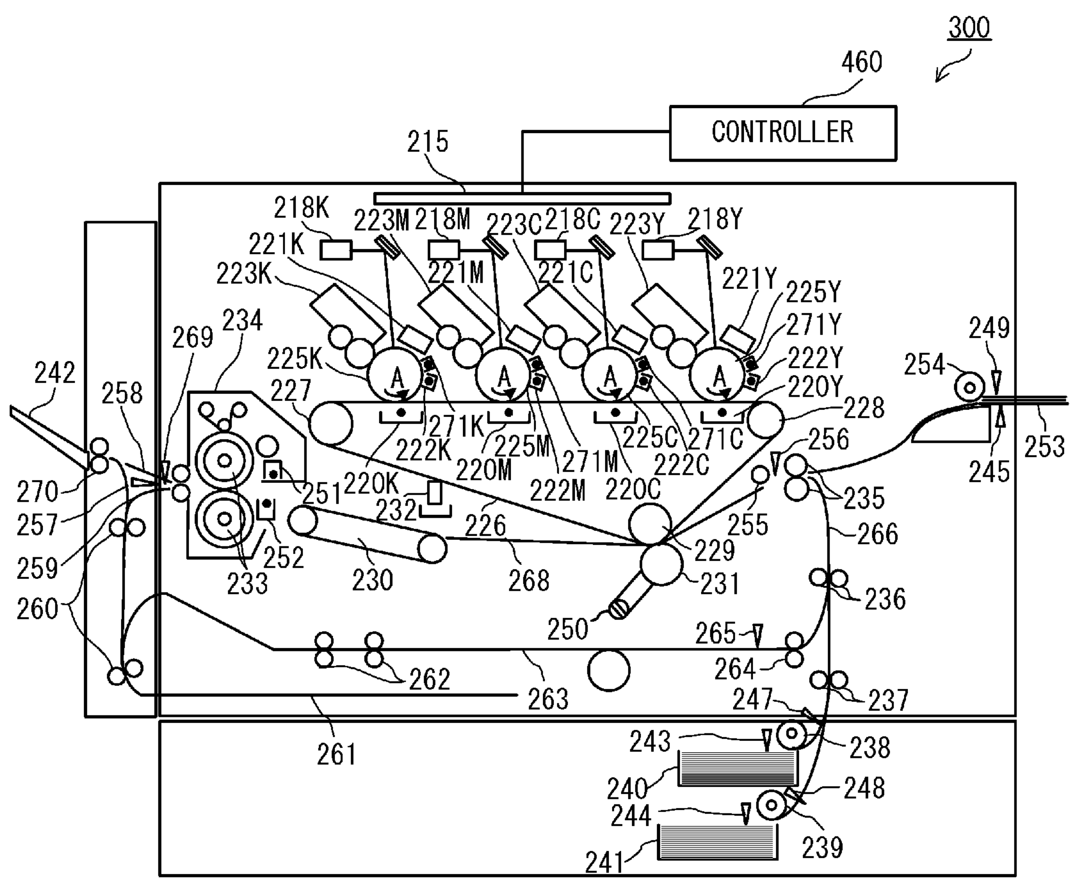
FIG. 2 is a detailed configuration view of an image forming unit.

FIG. 2 is a detailed configuration view of the image forming unit 300. The image forming unit 300 adopts electrophotograpy. In FIG. 2, alphabets Y, M, C, and K at the ends of reference numerals respectively represent colors of yellow, magenta, cyan, and black. The alphabets Y, M, C, and K at the ends of reference numerals are omitted in the following description in a case where all the colors are referred to in the description.

Photosensitive drums (hereinafter referred to as "photosensitive members") 225 are rotated in a direction of an arrow A in FIG. 2 by drive power from motors. A primary charging unit 221, an exposure unit 218, a developing unit 223, a transfer unit 220, a cleaner unit 222, and a deelectrifying unit 271 are provided around each photosensitive member 225.

The developing unit 223K is a developing module for monochromatic development, and develops an electrostatic latent image formed on the photosensitive member 225K with black toner. The developing units 223Y, 223M, and 223C are developing modules for color development. The developing units 223Y, 223M, and 223C respectively develop electrostatic latent images formed on the photosensitive members 225Y, 225M, and 225C with toners of yellow, magenta, and cyan. The toner images of the individual colors developed on the photosensitive members 225 are multi-transferred onto a transfer belt 226 serving as an intermediate transfer member by the transfer units 220 so that the toner images of the four colors are placed one on another.

The transfer belt 226 is stretched around rollers 227, 228, and 229. The roller 227 is a drive roller that drives the transfer belt 226 with drive power from a drive source. The roller 228 is a tension roller that adjusts the tension of the transfer belt 226. The roller 229 is a backup roller for a transfer roller as a secondary transfer unit 231. A transfer-roller attachment/detachment unit 250 is a drive unit for causing the secondary transfer unit 231 to come into contact with and move away from the transfer belt 226. A cleaner blade 232 is provided under the transfer belt 226 after passing the secondary transfer unit 231 to scrape the residual toner off the transfer belt 226.

Recording materials are stored in cassettes 240 and 241 and a manual feed unit 253. One of the stored recording materials is fed to a contact portion (nip portion) between the secondary transfer unit 231 and the transfer belt 226 by a pair of sheet feed rollers 235 and a registration roller 255. At this time, the secondary transfer unit 231 is brought into contact with the transfer belt 226 by the transfer-roller attachment/detachment unit 250. The toner image formed on the transfer belt 226 is transferred on the recording material at the nip portion. The toner image transferred on the recording material is thermally fixed thereon by a fixing unit 234. The recording material having the toner image fixed thereon is discharged outside.

The cassettes 240 and 241 and the manual feed unit 253 respectively include detection sensors 243, 244, and 245 for detecting whether or not a recording material is present. The cassettes 240 and 241 and the manual feed unit 253 respectively include sheet feed sensors 247, 248, and 249 to detect improper pickup of the recording material. The recording materials stored in the cassettes 240 and 241 are picked up one by one and conveyed via a pair of vertical path rollers 236 and 237 to the pair of sheet feed rollers 235 by pickup rollers 238 and 239. The recording materials stored in the manual feed unit 253 are picked up one by one and conveyed to the pair of sheet feed rollers 235 by a pickup roller 254.

The image forming operation of the image forming unit 300 is described below. In response to an instruction to start image formation, the recording material stored in the cassettes 240, 241 or the manual feed unit 253 are conveyed to the pair of sheet feed rollers 235 one by one by the pickup rollers 238, 239, and 254, respectively. The recording material is conveyed to the registration roller 255 by the pair of sheet feed rollers 235. A registration sensor 256 is located upstream of the registration roller 255 to detect passing of the recording material.

When the registration sensor 256 detects passing of the recording material, the pair of sheet feed rollers 235 stop. As a result, the recording material abuts on the halting registration roller 255 and stops. At this time, the posture of the recording material is adjusted so that the leading end of the recording material becomes perpendicular to the conveying path. This process is hereinafter referred to as "skew correction". The skew correction is executed to reduce the skew of an image to be formed on the recording material in the subsequent processes. After the skew correction, the registration roller 255 is activated to resume the conveying operation to convey the recording material to the secondary transfer unit 231. The registration roller 255 is coupled to a drive source via a clutch.

Meanwhile, the surface of the photosensitive member 225 is uniformly charged to be negative with a predetermined potential by the primary charging unit 221 applied with a voltage. Then, the exposure unit 218 exposes the charged surface of the photosensitive member 225 to form an electrostatic latent image thereon. The exposure unit 218 turns on or off laser light based on image data sent from a controller 460 via a printer control interface (I/F) 215.

A development bias preset for each color is applied to the developing roller of the developing unit 223. The developing roller develops the electrostatic latent image with toner to form a toner image. The toner image is transferred to the transfer belt 226 by the transfer unit 220, and is further transferred to the conveyed recording material by the secondary transfer unit 231. The recording material having the toner image transferred thereon passes through a conveying path 268, and is conveyed to the fixing unit 234 by a fixing conveying belt 230.

Pre-fixing chargers 251 and 252 in the fixing unit 234 charge the toner image transferred on the recording material to supplement toner adsorption power, thereby preventing disturbance of the image. Then, the fixing roller 233 thermally fixes the toner image on the recording material. The recording material having the toner image fixed thereon is conveyed by a sheet discharge roller 270, and is discharged onto a sheet discharge tray 242 via a conveying path switched to a sheet discharge path 258 by a sheet discharge flapper 257.

The toner remaining on the photosensitive member 225 is removed and collected by the cleaner unit 222. The photosensitive member 225 is uniformly deelectrified to near zero volt by the deelectrifying unit 271.

In the case of performing double-side printing, after an image is formed on the front surface of the recording material, the recording material is not discharged onto the sheet discharge tray 242, but an image is subsequently formed on the back surface of the recording material. An operation in the case of forming an image on the back surface of the recording material is described in detail. In the case of forming an image on the back surface of the recording material, the sheet discharge flapper 257 switches the conveying path to a back-side path 259 when the sensor 269 detects the recording material. Reversing rollers 260 convey the recording material which has passed the back-side path 259 to a double-side reversing path 261. After the recording material is conveyed to the double-side reversing path 261 by a feed directional width, the moving direction is switched by the reverse driving of the reversing rollers 260. Then, double-side path conveying rollers 262 convey the recording material having the front side down to a double-side path 263.

The recording material is conveyed on the double-side path 263 toward sheet re-feed rollers 264. When a sheet re-feed sensor 265 detects passing of the recording material (after passing of a predetermined time in this embodiment), the conveying operation is interrupted. The recording material abuts on the halting sheet re-feed rollers 264 and stops. At this time, the posture of the recording material is adjusted so that the leading end of the recording material becomes perpendicular to the conveying path. This process is hereinafter referred to as "skew re-correction".

The skew re-correction is executed to reduce the skew of an image to be formed on the back side of the recording material. After the skew re-correction, the sheet re-feed rollers 264 are activated. The sheet re-feed rollers 264 convey the recording material having the front side down onto the conveying path 266 again. The subsequent image forming operation is the same as the above-mentioned image forming operation, and hence its description is omitted. The recording material having the images formed on both sides is discharged onto the sheet discharge tray 242.

Note that, the image forming unit 300 can continuously feed recording material even at the time of double-side printing. However, the image forming unit 300 has a single mechanism for, for example, forming an image on a recording material and fixing a formed toner image, and hence printing on the front side and printing on the back side cannot be carried out at the same time. Therefore, at the time of double-side printing, the image forming unit 300 alternately forms an image on a recording material fed from the cassette 240 or 241 or the manual feed unit 253 and an image on a recording material which is reversed and re-fed for back-side printing.

Figure 3:
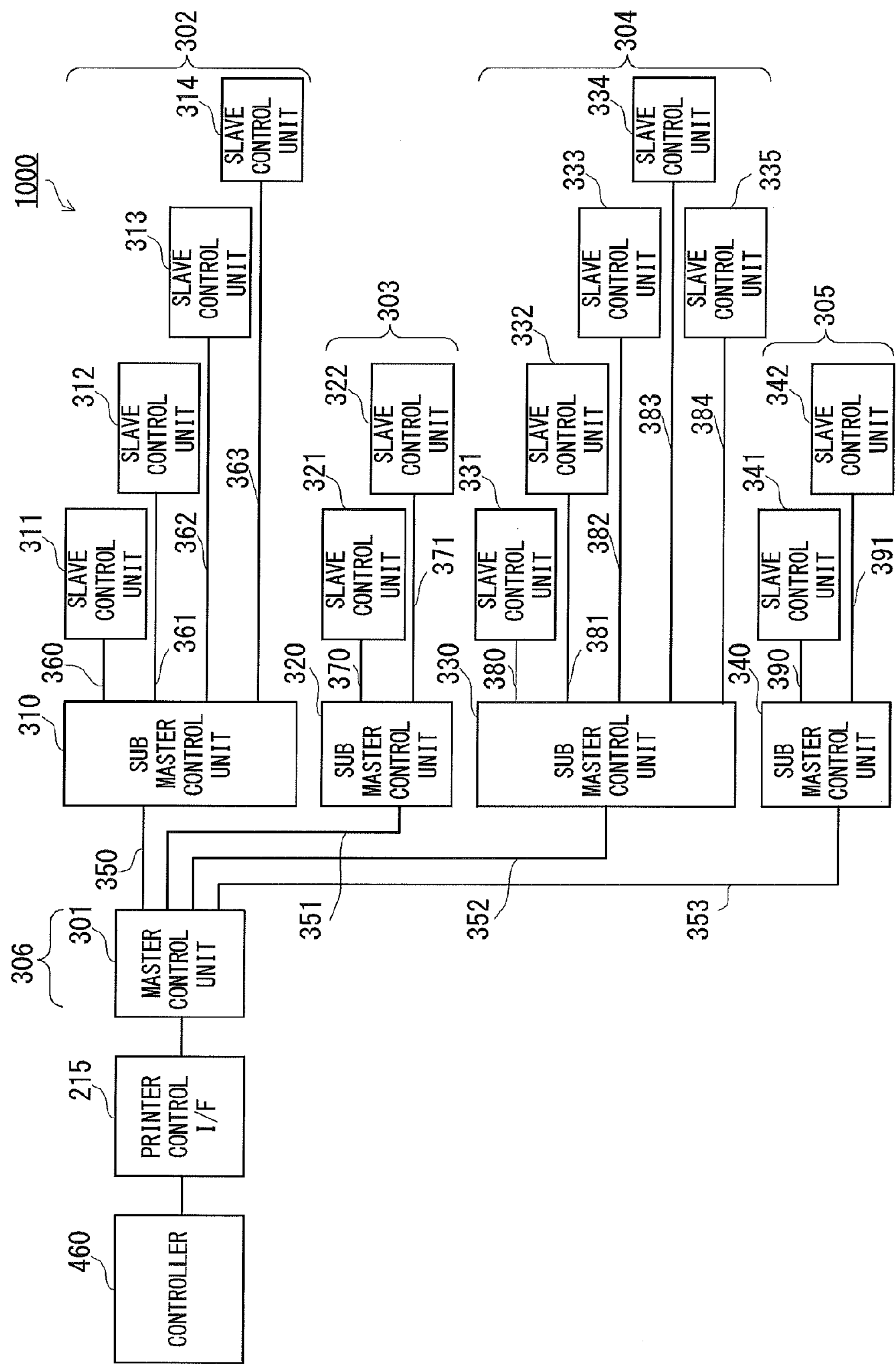
FIG. 3 is an exemplary configuration diagram of control modules.

The image forming unit 300 separates the individual components which have been described referring to FIG. 2 into four modules: a conveying module A; a conveying module B; an image forming module; and a fixing module. Four control modules autonomously control the connected load. A master module 306 performs the overall control of those four control modules so that the control modules function in cooperation with one another. FIG. 3 is a diagram illustrating an example of the configuration of the control modules.

A master control unit 301 performs the general operational control of the image forming unit 300 based on an instruction and image data sent from the controller 460 via the printer control I/F 215. A conveying module A 302, a conveying module B 303, an image forming module 304, and a fixing module 305 for forming an image respectively include sub master control units 310, 320, 330, and 340 which control the operations of the respective modules. The sub master control units 310, 320, 330, and 340 are controlled by the master control unit 301. Those control modules respectively include slave control units 311 to 314, slave control units 321 and 322, slave control units 331 to 335, and slave control units 341 and 342 for controlling the associated components to achieve the functions. The slave control units 311 to 314 are controlled by the sub master control unit 310. The slave control units 321 and 322 are controlled by the sub master control unit 320. The slave control units 331 to 335 are controlled by the sub master control unit 330. The slave control units 341 and 342 are controlled by the sub master control unit 340.

The master control unit 301 is connected to the plurality of sub master control units 310, 320, 330, and 340 via one-to-one connected (peer-to-peer connected) serial communication buses 350 to 353. The sub master control unit 310 is connected one to one to the plurality of slave control units 311 to 314 via serial communication buses 360 to 363, respectively. Likewise, the sub master control unit 320 is connected to the slave control units 321 and 322 via serial communication buses 370 and 371, respectively. The sub master control unit 330 is connected one to one to the slave control units 331 to 335 via serial communication buses 380 to 384, respectively. The sub master control unit 340 is connected to the slave control units 341 and 342 via serial communication buses 390 and 391, respectively.

Figure 4:
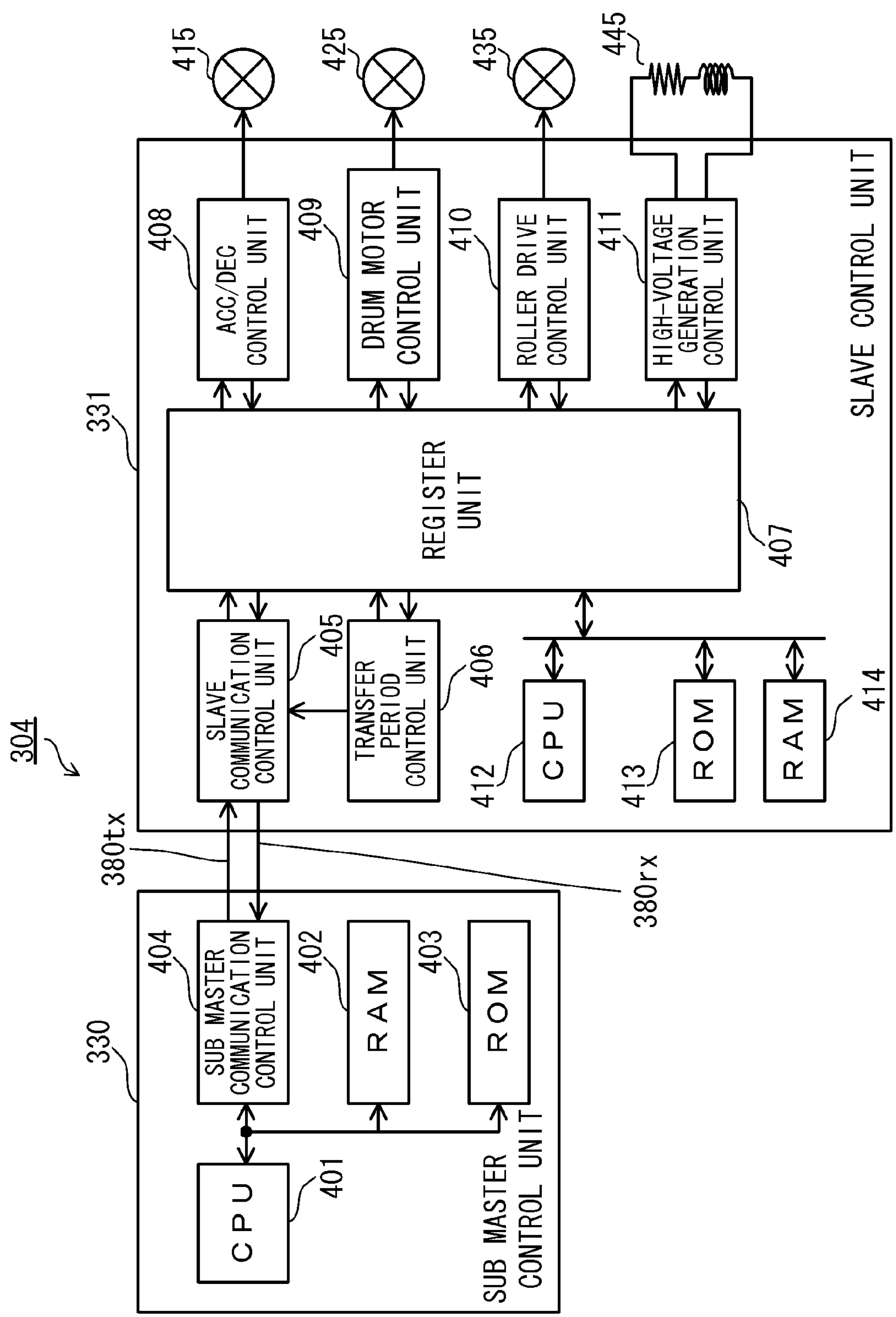
FIG. 4 is a configuration diagram illustrating a part of an image forming module.

FIG. 4 is a configuration diagram illustrating a part of the image forming module 304.

The sub master control unit 330 includes a CPU 401, a sub master communication control unit 404, a random access memory (RAM) 402, and a read only memory (ROM) 403. The CPU 401 controls an operation and a sequence that are associated with image formation, which is one of the functions of the image forming apparatus 1000. The RAM 402 is used as a temporary memory region of the CPU 401. The ROM 403 stores a program for controlling the operation and sequence that are associated with image formation. The sub master communication control unit 404 executes one-to-one serial communication to the slave control unit 331 via serial communication buses 380*tx* and 380*rx*. The sub master control unit 330 transmits transmission data including a command for instructing a process to be executed by the slave control unit 331, and data for the process via the serial communication bus 380*tx*. The slave control unit 331 controls a loads connected to the slave control unit 331 based on the command and data received from the sub master control unit 330. The sub master control unit 330 controls the operation of the slave control unit 331 to control the process associated with the image formation that is carried out by the load connected to the slave control unit 331.

The slave control unit 331 is controlled by the CPU 401 of the sub master control unit 330 via the serial communication bus 380. A slave communication control unit 405 writes data received from the sub master control unit 330 into a designated register unit 407. A transfer period control unit 406 measures a reference period for transferring register information stored in the register unit 407 to the sub master control unit 330. The register unit 407 stores transmission data transmitted from the sub master control unit 330. The slave control unit 331 includes a CPU 412, a ROM 413, and a RAM 414. Based on a program stored in the ROM 413, the CPU 412 determines whether or not the data has been appropriately received, and executes a process corresponding to a received instruction and a process associated with a continuously read process to be described later. The register unit 407 stores data representing the states of a polygon mirror drive motor 415, a drum motor 425, a roller drive motor 435, a boosting coil 445, and the like whose operations are controlled by the slave control unit 331, and data representing the state of the slave control unit 331. Data representing the states of the polygon mirror drive motor 415, the drum motor 425, the roller drive motor 435, the boosting coil 445, and the like, and data representing the state of the slave control unit 331 itself are examples of register information.

An ACC/DEC control unit 408 is a drive unit that rotates the polygon mirror drive motor 415. The ACC/DEC control unit 408 performs acceleration control and deceleration control on the polygon mirror drive motor 415 which rotates a polygon mirror in a predetermined period.

A drum motor control unit 409 is a drive unit for a drum motor 425 which rotates the photosensitive member 225Y. Though not illustrated, the slave control units associated with the control of the photosensitive members 225M, 225C, and 225K have the same configurations. The slave control units individually control colors of yellow, magenta, cyan, and black.

A roller drive control unit 410 controls a roller drive motor 435 to rotate the roller 227 so as to control the drive of the roller 227 that rotates the transfer belt 226 at a predetermined speed.

A high-voltage generation control unit 411 generates a pulse width modulation (PWM) signal for driving the boosting coil 445. The boosting coil 445 generates a voltage for primary charging. The primary charging units 221M, 221C, and 221K are likewise controlled by the other slave control units (not shown).

The sequence of controls is carried out by the CPU 401 of the sub master control unit 330 via the serial communication bus 380. Note that, the polygon mirror drive motor 415, the drum motor 425, the roller drive motor 435, and the boosting coil 445 are examples of the drive units.

Each of the slave control units 332 to 335 has the same configuration as that of the slave control unit 331. Each of the sub master control units 310, 320, and 340 has a similar connection structure with respect to the corresponding slave control unit connected thereto.

Figure 5:
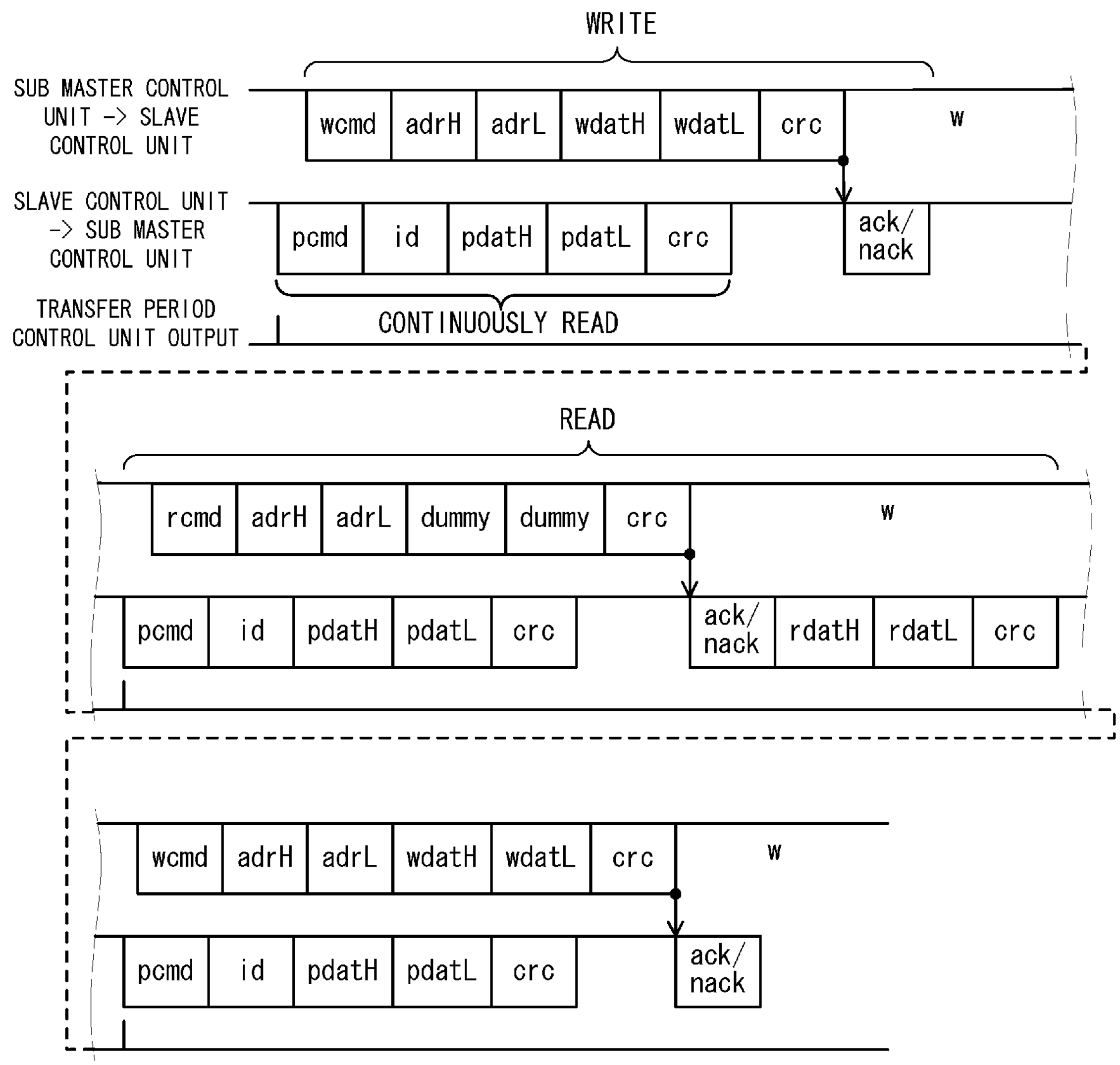
FIG. 5 is an exemplary diagram illustrating a data communication protocol.

FIG. 5 is an exemplary diagram illustrating data communication which is carried out via the serial communication bus 380.

FIG. 5 exemplifies the frame structures of write instructing transmission data and read instructing transmission data which are transmitted to the slave control unit 331 from the sub master control unit 330. The write instruction from the sub master control unit 330 instructs writing of data into the register unit 407 of the slave control unit 331. The read instruction from the sub master control unit 330 instructs reading of data stored in the register unit 407 of the slave control unit 331. FIG. 5 further exemplifies the frame structure of transmission data which relates to the continuously read and is transmitted to the sub master control unit 330 from the slave control unit 331.

The frame of write instructing transmission data which is transmitted to the slave control unit 331 from the sub master control unit 330 includes a write command (wcmd), an upper address (adrH), a lower address (adrL), upper write data (wdatH), lower write data (wdatL), and cyclic redundancy check data (crc). The write command (wcmd) indicates that this transmission data instructs writing. The upper address and lower address are data designating a register. The upper write data and lower write data are data to be written in the register.

The frame of read instructing transmission data which is transmitted to the slave control unit 331 from the sub master control unit 330 includes a read command (rcmd), an upper address (adrH), a lower address (adrL), dummy data (dummy) for matching the frame length with the frame length in the write mode, and cyclic redundancy check data (crc). According to this embodiment, the dummy data is added to the read instructing transmission data so that the length of the read instructing transmission data does not become shorter than the length of transmission data relating to the continuously read. This addition is made to prevent transmission data associated with the continuously read from overlapping an acknowledge (ack) signal or a negative acknowledge (nack) signal.

When receiving write instructing transmission data from the sub master control unit 330, the slave control unit 331 returns the ack signal or the nack signal. When receiving read instructing transmission data from the sub master control unit 330, the slave control unit 331 returns the nack signal or the ack signal, and data including data read from the register.

Figure 6:
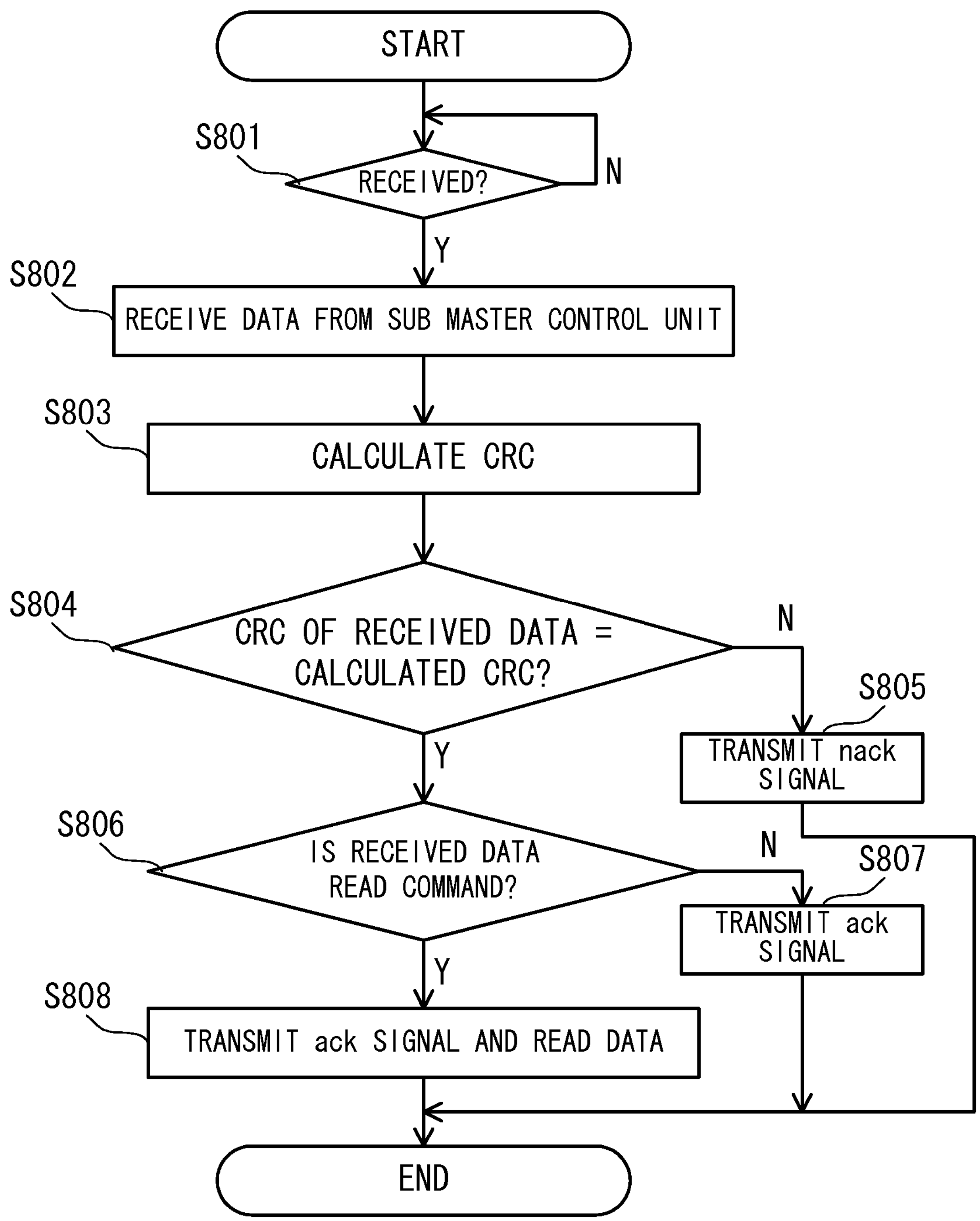
FIG. 6 is a flowchart illustrating a process flow from reception of data by a slave control unit to returning of data.

FIG. 6 is a flowchart illustrating a process flow from reception of transmission data to returning of data to the sub master control unit 330, which is performed by the slave control unit 331.

When receiving data from the sub master control unit 330, the slave control unit 331 calculates CRC from the received data (S801: Y, S802, S803). After calculating the CRC, the slave control unit 331 compares the calculated CRC with the received cyclic redundancy check data (S804). When the calculated CRC does not coincide with the received cyclic redundancy check data, the slave control unit 331 determines that the received data is not correct due to noise or the like, and transmits the nack signal to the sub master control unit 330 (S804: N, S805).

When the calculated CRC coincides with the received cyclic redundancy check data, the slave control unit 331 checks whether the received data includes a read command (S804: Y, S806). When the received data does not include a read command, the slave control unit 331 transmits the ack signal to the sub master control unit 330 (S806: N, S807). When the received data includes a read command, the slave control unit 331 transmits the ack signal along with read data to the sub master control unit 330 (S806: Y, S808).

That is, when data has been received properly, the ack signal is returned, whereas when data has not been received properly, the nack signal is returned. When the nack signal is returned from the slave control unit 331, the sub master control unit 330 re-sends the instruction. These processes permit instructions associated with image formation to be executed sequentially and properly. That is, the control sequence associated with image formation can be executed appropriately. Transmission of transmission data to be transmitted to the sub master control unit 330 from the slave control unit 331 in reading starts after data up to the cyclic redundancy check data is received. The slave control unit 331 calculates the CRC from the received read command, upper address, and lower address, and compares the calculated CRC with the received cyclic redundancy check data. When the calculated CRC coincides with the received cyclic redundancy check data, the slave control unit 331 outputs an ack signal, and then outputs upper read data (rdatH), lower read data (rdatL), and cyclic redundancy check data (crc). The upper read data (rdatH), lower read data (rdatL), and cyclic redundancy check data (crc) are collectively referred to as read data. When the calculated CRC does not coincide with the received cyclic redundancy check data, the slave control unit 331 determines that the received data is not correct due to noise or the like, outputs only a nack signal, and terminates the communication. Because it is the negative acknowledgement, it is unnecessary to output upper read data, lower read data, and cyclic redundancy check data following the nack signal.

In the following, description is made of a communication protocol for data to be transmitted to the sub master control unit 330 from the slave control unit 331 for efficiently using the serial communication bus 380*rx* (hereinafter referred to as "continuously read").

The continuously read mode is executed based on an instruction from the sub master control unit 330. The continuously read is used when the sub master control unit 330 needs to acquire the latest information in real time, such as when the output value of the sensor that is connected to the conveying module to detect the state of sheet conveying is always monitored.

The sub master control unit 330 can acquire register information in the slave control unit 331 using continuously read data. With the register information acquired, the sub master control unit 330 can generate, for example, transmission data in the write mode based on the register information. When the register information represents the state of the polygon mirror drive motor 415 (e.g., the number of rotations), for example, the sub master control unit 330 generates transmission data in the write mode in such a way that this state (number of rotations) becomes a predetermined state (number of rotations). The state of the drive unit can be appropriately adjusted in this manner.

The frame of transmission data to be transmitted to the sub master control unit 330 from the slave control unit 331 in the continuously read mode (hereinafter referred to as "continuously read data") includes a continuously read command (pcmd) indicating that the transmission data is continuously read data. The frame includes a transmission read data number (id), upper continuously read data (pdatH), lower continuously read data (pdatL), and cyclic redundancy check data (crc) following the continuously read command. The cyclic redundancy check data is calculated by the slave control unit 331 based on the continuously read command, the transmission read data number, the upper continuously read data, and the lower continuously read data.

The sub master control unit 330 calculates the CRC based on the received continuously read command, transmission read data number, upper continuously read data, and lower continuously read data, and compares the calculation result with the received cyclic redundancy check data. When the calculated CRC coincides with the received cyclic redundancy check data, the sub master control unit 330 determines that transmission and reception have been executed correctly, and acquires the continuously read data. When the calculated CRC does not coincide with the received cyclic redundancy check data, the sub master control unit 330 determines that the received data is not correct due to noise or the like, and does not acquire the continuously read data.

Figure 7:
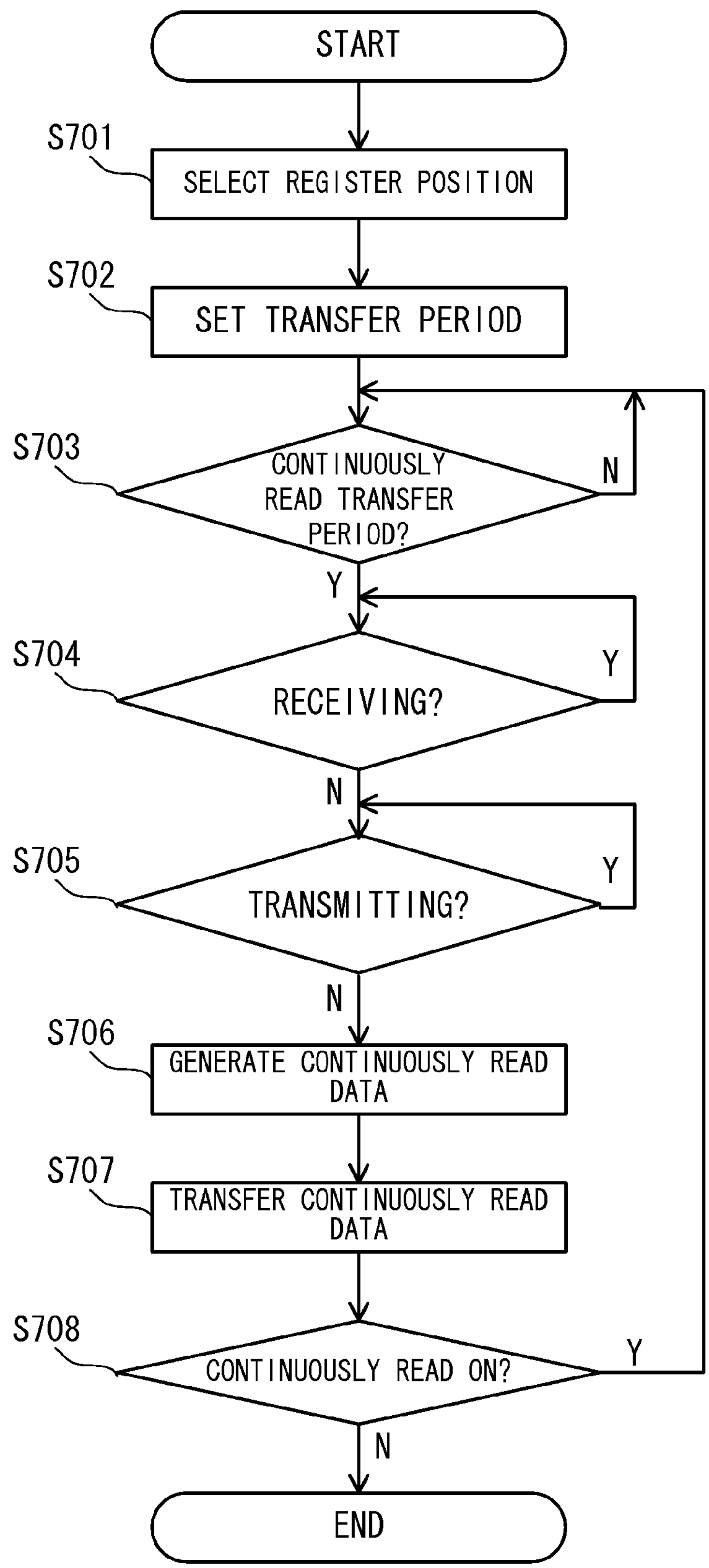
FIG. 7 is a flowchart illustrating a transfer flow of continuously read data.

Referring to FIGS. 5 and 7, a flow for continuously read data which is transmitted from the slave control unit 331 to the sub master control unit 330 is described. FIG. 7 is a flowchart illustrating the flow for continuously read data.

The slave communication control unit 405 sets the continuously read mode and selects a register position (address) to read data from the register unit 407 in the slave control unit 331 based on an instruction from the sub master control unit 330 (S701). Further, the slave communication control unit 405 sets a transfer period in the transfer period control unit 406 and enables the continuously read based on an instruction from the sub master control unit 330 (S702).

The slave communication control unit 405 in the slave control unit 331 determines a transfer timing for continuously read data based on a transfer period signal output from the transfer period control unit 406 in accordance with the transfer period (S703). The slave communication control unit 405 waits until the timing of the transfer period for continuously read data (S703: N).

When the timing of the transfer period for continuously read data arrives, the slave communication control unit 405 determines whether or not the slave control unit 331 is receiving data via the serial communication bus 380*tx* (S703: Y, S704). When the slave control unit 331 is receiving data, the slave communication control unit 405 stands by until the reception ends (S704: Y).

When the data reception by the slave control unit 331 ends, the slave communication control unit 405 determines whether or not the slave control unit 331 is transmitting data via the serial communication bus 380*rx* (S704: N, S705). When the slave control unit 331 is transmitting data, the slave communication control unit 405 stands by until the transmission ends (S705: Y). When the slave control unit 331 is not transmitting data, the slave communication control unit 405 proceeds to a sequence of transferring continuously read data (S705: N).

These processes can prevent transmission of read data in the continuously read mode from overlapping returning data in response to an instruction from the sub master control unit 330, and thus prevent interference with returning data. That is, continuously read data can be transmitted using an available time at which the serial communication bus 380*rx* is not used because there is no returning data in response to an instruction from the sub master control unit 330.

In the sequence of transferring continuously read data, first, the slave communication control unit 405 acquires register information at the register position in the register unit 407 which is selected in Process S701. Acquisition of register information at this timing is to acquire the latest register information. The slave communication control unit 405 having acquired register information generates continuously read data including the acquired register information in accordance with the communication protocol for continuously read data (S706), which has been described referring to FIG. 5. The slave communication control unit 405 transfers the generated continuously read data to the sub master control unit 330 via the serial communication bus 380*rx* (S707).

Processes S703 to S707 are repeatedly executed while continuously read is enabled (S708: Y, S703). When continuously read is disabled, continuously read is terminated (S708: N). When the CPU 401 of the sub master control unit 330 transmits data for terminating continuously read, the slave control unit 331 disables continuously read.

In the continuously read mode according to this embodiment, as apparent from the above, transmission of read data is triggered by the transfer period. When the slave control unit 331 has received data from the sub master control unit 330 at that timing, and when the slave control unit 331 has made a response to the instruction from the sub master control unit 330 at that timing, however, the transmission timing for read data is delayed.

In other words, when data is not transmitted from the sub master communication control unit 404 of the sub master control unit 330 via the serial communication bus 380*tx*, the slave communication control unit 405 of the slave control unit 331 transfers continuously read data. Therefore, continuously read can be achieved without interfering with communication with the sub master control unit 330. In addition, the amount of transfer can be increased by efficiently using the serial communication bus 380.

Figure 8:
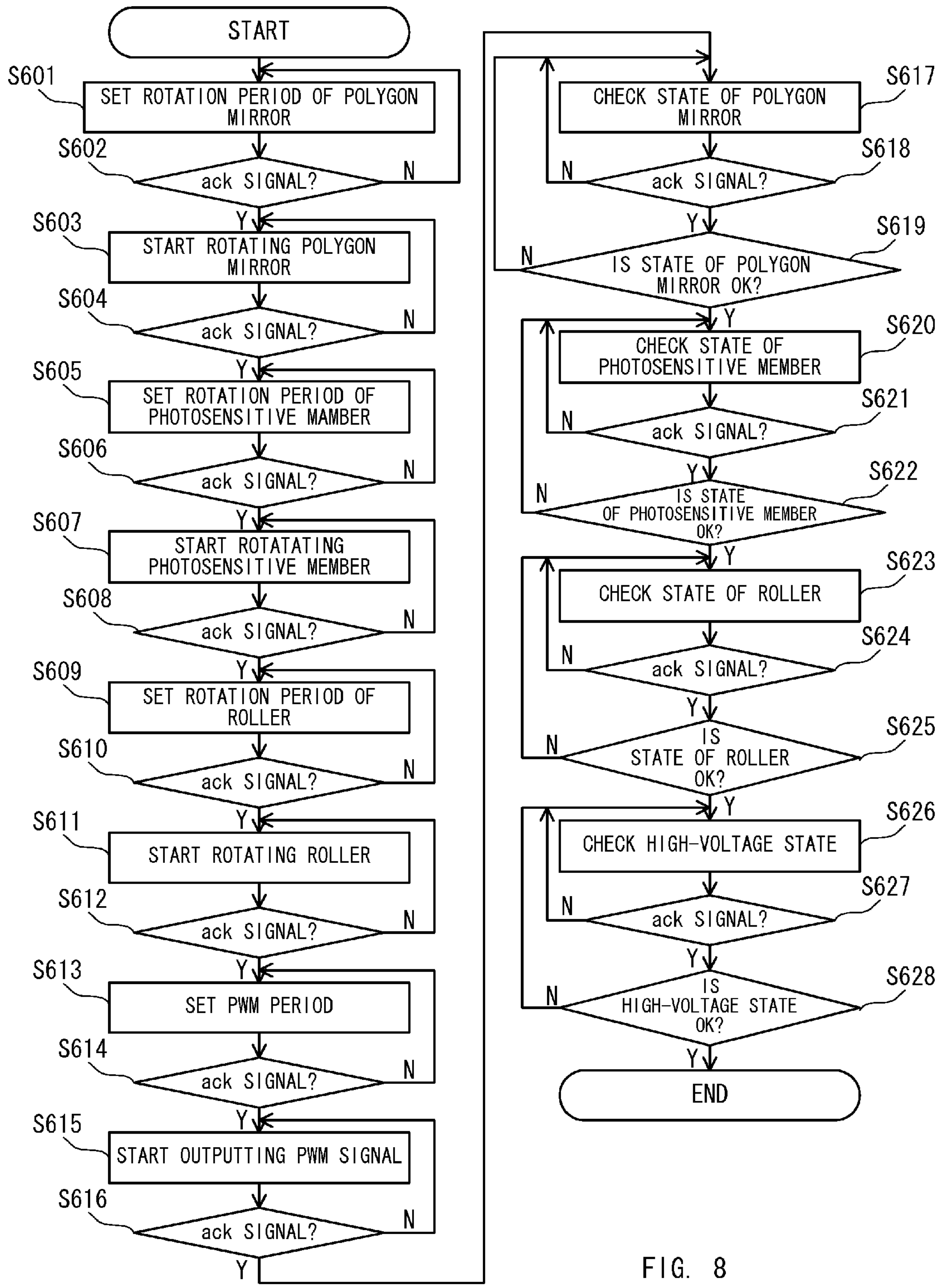
FIG. 8 is a flowchart illustrating a preparation sequence of the image forming module.

FIG. 8 is a flowchart illustrating a preparation sequence of the image forming module 304.

When the preparation sequence of the image forming module 304 starts, the slave control unit 331 starts control of the rotation of the polygon mirror by the ACC/DEC control unit 408. First, in order to set the rotation period of the polygon mirror, the sub master control unit 330 transmits data to the slave control unit 331 based on the communication protocol illustrated in FIG. 5. This transmission data includes, for write instruction, a write command (0x55), an upper address (0x00), a lower address (0x01), upper write data (0x11), lower write data (0x11), and cyclic redundancy check data (0xFE). When the slave control unit 331 has received the data correctly, the ACC/DEC control unit 408 sets the rotation period of the polygon mirror (S601). Then, the slave control unit 331 transmits an ack signal to the sub master control unit 330. When the slave control unit 331 has not received the data correctly, on the other hand, the ACC/DEC control unit 408 does not set the rotation period of the polygon mirror, and transmits a nack signal to the sub master control unit 330.

When the sub master control unit 330 has received the nack signal from the slave control unit 331 or has not received the ack signal correctly, the sub master control unit 330 resends the data (S602: N, S601).

When the sub master control unit 330 has received the ack signal correctly, the sub master control unit 330 causes the slave control unit 331 to start rotating the polygon mirror. In order to achieve this process, the sub master control unit 330 transmits to the slave control unit 331 data for instructing the slave control unit 331 to start rotating the polygon mirror. This transmission data instructs writing. The transmission data includes a write command (0x55), an upper address (0x00), a lower address (0x02), upper write data (0x00), lower write data (0x01), and cyclic redundancy check data (0xFD).

When receiving the data correctly, the slave control unit 331 starts rotating the polygon mirror by the ACC/DEC control unit 408 (S602: Y, S603). Then, the slave control unit 331 transmits the ack signal to the sub master control unit 330. When the slave control unit 331 has not received the data correctly, on the other hand, the slave control unit 331 transmits the nack signal to the sub master control unit 330. When the sub master control unit 330 has received the nack signal from the slave control unit 331 or has not received the ack signal correctly, the sub master control unit 330 resends the data (S604: N, S603).

When the sub master control unit 330 has received the ack signal correctly in Process S604, the sub master control unit 330 causes the slave control unit 331 to set a rotation period of the photosensitive member 225Y. In order to achieve this process, the sub master control unit 330 transmits to the slave control unit 331 data for setting the rotation period of the photosensitive member 225Y. This transmission data instructs writing. The transmission data includes a write command (0x55), an upper address (0x00), a lower address (0x03), upper write data (0x33), lower write data (0x33), and cyclic redundancy check data (0xFB).

When receiving the data correctly, the slave control unit 331 sets the rotation period of the photosensitive member 225Y by the drum motor control unit 409 (S604: Y, S605). Then, the slave control unit 331 transmits the ack signal to the sub master control unit 330. When the slave control unit 331 has not received the data correctly, on the other hand, the slave control unit 331 transmits the nack signal to the sub master control unit 330. When the sub master control unit 330 has received the nack signal from the slave control unit 331 or has not received the ack signal correctly, the sub master control unit 330 resends the data (S606: N, S605).

When the sub master control unit 330 has received the ack signal correctly in Process S606, the sub master control unit 330 causes the slave control unit 331 to start rotating the photosensitive member 225Y. In order to achieve this process, the sub master control unit 330 transmits to the slave control unit 331 data for instructing the slave control unit 331 to start rotating the photosensitive member 225Y. This transmission data instructs writing. The transmission data includes a write command (0x55), an upper address (0x00), a lower address (0x04), upper write data (0x00), lower write data (0x01), and cyclic redundancy check data (0xFB).

When receiving the data correctly, the slave control unit 331 starts rotating the photosensitive member 225Y by the drum motor control unit 409 (S606: Y, S607). Then, the slave control unit 331 transmits the ack signal to the sub master control unit 330. When the slave control unit 331 has not received the data correctly, on the other hand, the slave control unit 331 transmits the nack signal to the sub master control unit 330. When the sub master control unit 330 has received the nack signal from the slave control unit 331 or has not received the ack signal correctly, the sub master control unit 330 resends the data (S608: N, S607).

When the sub master control unit 330 has received the ack signal correctly in Process S608, the sub master control unit 330 causes the slave control unit 331 to set a rotation period of the roller 227. In order to achieve this process, the sub master control unit 330 transmits to the slave control unit 331 data for setting the rotation period of the roller 227. This transmission data instructs writing. The transmission data includes a write command (0x55), an upper address (0x00), a lower address (0x05), upper write data (0x55), lower write data (0x55), and cyclic redundancy check data (0xFB).

When receiving the data correctly, the slave control unit 331 sets the rotation period of the roller 227 by the roller drive control unit 410 (S608: Y, S609). Then, the slave control unit 331 transmits the ack signal to the sub master control unit 330. When the slave control unit 331 has not received the data correctly, on the other hand, the slave control unit 331 transmits the nack signal to the sub master control unit 330. When the sub master control unit 330 has received the nack signal from the slave control unit 331 or has not received the ack signal correctly, the sub master control unit 330 resends the data (S610: N, S609).

When the sub master control unit 330 has received the ack signal correctly in Process S610, the sub master control unit 330 causes the slave control unit 331 to start rotating the roller 227. In order to achieve this process, the sub master control unit 330 transmits to the slave control unit 331 data for instructing the slave control unit 331 to start rotating the roller 227. This transmission data instructs writing. The transmission data includes a write command (0x55), an upper address (0x00), a lower address (0x06), upper write data (0x00), lower write data (0x01), and cyclic redundancy check data (0xFB).

When receiving the data correctly, the slave control unit 331 starts rotating the roller 227 by the roller drive control unit 410 (S610: Y, S611). Then, the slave control unit 331 transmits the ack signal to the sub master control unit 330. When the slave control unit 331 has not received the data correctly, on the other hand, the slave control unit 331 transmits the nack signal to the sub master control unit 330. When the sub master control unit 330 has received the nack signal from the slave control unit 331 or has not received the ack signal correctly, the sub master control unit 330 resends the data (S612: N, S611).

When the sub master control unit 330 has received the ack signal correctly in Process S612, the sub master control unit 330 causes the slave control unit 331 to set a PWM period in order to control high voltage. In order to achieve this process, the sub master control unit 330 transmits to the slave control unit 331 data for setting the PWM period. This transmission data instructs writing. The transmission data includes a write command (0x55), an upper address (0x00), a lower address (0x07), upper write data (0x77), lower write data (0x77), and cyclic redundancy check data (0xFB).

When receiving the data correctly, the slave control unit 331 sets the PWM period by the high-voltage generation control unit 411 (S612: Y, S613). Then, the slave control unit 331 transmits the ack signal to the sub master control unit 330. When the slave control unit 331 has not received the data correctly, on the other hand, the slave control unit 331 transmits the nack signal to the sub master control unit 330. When the sub master control unit 330 has received the nack signal from the slave control unit 331 or has not received the ack signal correctly, the sub master control unit 330 resends the data (S614: N, S613).

When the sub master control unit 330 has received the ack signal correctly in Process S614, the sub master control unit 330 causes the slave control unit 331 to start outputting a PWM signal. In order to achieve this process, the sub master control unit 330 transmits to the slave control unit 331 data for instructing the slave control unit 331 to start outputting the PWM signal. This transmission data instructs writing. The transmission data includes a write command (0x55), an upper address (0x00), a lower address (0x08), upper write data (0x00), lower write data (0x01), and cyclic redundancy check data (0xFB).

When receiving the data correctly, the slave control unit 331 starts outputting the PWM signal by the high-voltage generation control unit 411 (S614: Y, S615). Then, the slave control unit 331 transmits the ack signal to the sub master control unit 330. When the slave control unit 331 has not received the data correctly, on the other hand, the slave control unit 331 transmits the nack signal to the sub master control unit 330. When the sub master control unit 330 has received the nack signal from the slave control unit 331 or has not received the ack signal correctly, the sub master control unit 330 resends the data (S616: N, S615).

When the sub master control unit 330 has received the ack signal correctly in Process S616, the sub master control unit 330 causes the slave control unit 331 to check the state of the polygon mirror. In order to achieve this process, the sub master control unit 330 transmits to the slave control unit 331 data for instructing the slave control unit 331 to check the state of the polygon mirror. This transmission data instructs reading. The transmission data includes a read command (0xAA), an upper address (0x10), a lower address (0x01), dummy data (0x00), dummy data (0x00), and cyclic redundancy check data (0xED).

When receiving the data correctly, the slave control unit 331 checks the state of the polygon mirror by the ACC/DEC control unit 408 (S616: Y, S617). Then, the slave control unit 331 transmits the ack signal and read data representing the state of the polygon mirror to the sub master control unit 330. When the slave control unit 331 has not received the data correctly, on the other hand, the slave control unit 331 transmits the nack signal to the sub master control unit 330. When the sub master control unit 330 has received the nack signal from the slave control unit 331 or has not received the ack signal and the read data correctly, the sub master control unit 330 resends the data (S618: N, S617).

When receiving the ack signal from the slave control unit 331 correctly, the sub master control unit 330 checks the rotation state of the polygon mirror based on the read data (S618: Y, S619). When the rotation state of the polygon mirror is abnormal, the sub master control unit 330 checks the rotation state of the polygon mirror again (S619: N, S617).

When the rotation state of the polygon mirror is normal, the sub master control unit 330 causes the slave control unit 331 to check the state of the photosensitive member 225Y (S619: Y). In order to achieve this process, the sub master control unit 330 transmits to the slave control unit 331 data for instructing the slave control unit 331 to check the state of the photosensitive member 225Y. This transmission data instructs reading. The transmission data includes a read command (0xAA), an upper address (0x20), a lower address (0x01), dummy data (0x00), dummy data (0x00), and cyclic redundancy check data (0xEC).

When receiving the data correctly, the slave control unit 331 checks the state of the photosensitive member 225Y by the drum motor control unit 409 (S620). Then, the slave control unit 331 transmits the ack signal and read data representing the state of the photosensitive member 225Y to the sub master control unit 330. When the slave control unit 331 has not received the data correctly, on the other hand, the slave control unit 331 transmits the nack signal to the sub master control unit 330. When the sub master control unit 330 has received the nack signal from the slave control unit 331 or has not received the ack signal and the read data correctly, the sub master control unit 330 resends the data (S621: N, S620).

When receiving the ack signal from the slave control unit 331 correctly, the sub master control unit 330 checks the state of the photosensitive member 225Y based on the read data (S621: Y, S622). When the state of the photosensitive member 225Y is abnormal, the sub master control unit 330 checks the state of the photosensitive member 225Y again (S622: N, S620).

When the state of the photosensitive member 225Y is normal, the sub master control unit 330 causes the slave control unit 331 to check the state of the roller 227 (S622: Y). In order to achieve this process, the sub master control unit 330 transmits to the slave control unit 331 data for instructing the slave control unit 331 to check the state of the roller 227. This transmission data instructs reading. The transmission data includes a read command (0xAA), an upper address (0x30), a lower address (0x01), dummy data (0x00), dummy data (0x00), and cyclic redundancy check data (0xEB).

When receiving the data correctly, the slave control unit 331 checks the state of the roller 227 by the roller drive control unit 410 (S623). Then, the slave control unit 331 transmits the ack signal and read data representing the state of the roller 227 to the sub master control unit 330. When the slave control unit 331 has not received the data correctly, on the other hand, the slave control unit 331 transmits the nack signal to the sub master control unit 330. When the sub master control unit 330 has received the nack signal from the slave control unit 331 or has not received the ack signal and the read data correctly, the sub master control unit 330 resends the data (S624: N, S623).

When receiving the ack signal from the slave control unit 331 correctly, the sub master control unit 330 checks the state of the roller 227 based on the read data (S624: Y, S625). When the state of the roller 227 is abnormal, the sub master control unit 330 checks the state of the roller 227 again (S625: N, S623).

When the state of the roller 227 is normal, the sub master control unit 330 causes the slave control unit 331 to check the high-voltage state (S625: Y). In order to achieve this process, the sub master control unit 330 transmits to the slave control unit 331 data for instructing the slave control unit 331 to check the high-voltage state. This transmission data instructs reading. The transmission data includes a read command (0xAA), an upper address (0x40), a lower address (0x01), dummy data (0x00), dummy data (0x00), and cyclic redundancy check data (0xEA).

When receiving the data correctly, the slave control unit 331 checks the high-voltage state by the high-voltage generation control unit 411 (S626). Then, the slave control unit 331 transmits the ack signal and read data representing the high-voltage state to the sub master control unit 330. When the slave control unit 331 has not received the data correctly, on the other hand, the slave control unit 331 transmits the nack signal to the sub master control unit 330. When the sub master control unit 330 has received the nack signal from the slave control unit 331 or has not received the ack signal and the read data correctly, the sub master control unit 330 resends the data (S627: N, S626).

When receiving the ack signal from the slave control unit 331 correctly, the sub master control unit 330 checks the high-voltage state based on the read data (S627: Y, S628). When the high-voltage state is abnormal, the sub master control unit 330 checks the high-voltage state again (S628: N, S626). When the high-voltage state is normal, the preparation of the image forming module 304 ends (S628: Y).

As in the above-mentioned manner, through the control sequence using the communication protocol illustrated in FIG. 5, the preparation sequence of the image forming module 304 ends.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-153692, filed Jul. 9, 2012, which is hereby incorporated by reference herein in its entirety.

What is claimed is:

1. An image forming apparatus, comprising:

a first control unit configured to transmit an instruction to a second control unit and receive a return which corresponds to the instruction from the second control unit;

the second control unit that is connected to a load, and is configured to receive the instruction from the first control unit and control the load based on the instruction;

a first communication line configured to transmit data from the first control unit to the second control unit; and a second communication line configured to transmit data from the second control unit to the first control unit, wherein the second control unit comprises:

a holding unit configured to hold data; and a processor configured to transmit a return to the first control unit by using the second communication line when receiving the instruction from the first control unit via the first communication line, and configured to transmit the data held in the holding unit to the first control unit periodically based on a set period by using the second communication line when receiving the instruction to set to a specific mode from the first control unit via the first communication line, and wherein the processor, which is in the specific mode, is configured to determine at the timing for transmitting the data held in the holding unit based on the set period if it is determined that it is the timing for transmitting the data held in the holding unit, determine whether or not it is in a first state of the reception of the instruction from the first control unit via the first communication line and whether or not it is in a second state of the return to the first control unit using the second communication line and, if it is determined that it is neither in the first state nor in the second state, transmit the data held in the holding unit, and if it is determined that it is in the first state or in the second state, delay a timing for transmitting the data held in the holding unit so that the transmission of the data held in the holding unit is prevented from overlapping the transmission of the return.

2. An image forming apparatus according to claim 1, wherein the second control unit comprises a determination unit configured to determine whether the instruction from the first control unit has been properly received via the first communication line, and wherein the return is a determination result from the determination unit.

3. An image forming apparatus according to claim 2, wherein the instruction from the first control unit includes command data, data indicating an address in the holding unit, and cyclic redundancy check data, and wherein the determination unit is configured to determine whether the instruction from the first control unit has been properly received, based on cyclic redundancy check data calculated from the instruction received from the first control unit and the cyclic redundancy check data included in the instruction from the first control unit.

4. An image forming apparatus according to claim 1, wherein the processor is configured to read the data held in the holding unit at the delayed timing.

5. An image forming apparatus according to claim 1, wherein the instruction from the first control unit includes a write instruction and a read instruction, wherein the write instruction includes a command indicating the write instruction, data indicating an address in the holding unit, data to be written at the address in the holding unit, and cyclic redundancy check data, wherein the read instruction includes a command indicating the read instruction, data indicating an address in the holding unit, dummy data, and cyclic redundancy check data, and wherein a bit length of the write instruction is equal to a bit length of the read instruction.

6. A communication method to be executed by a second control unit, the second control unit being configured to communicate to a first control unit by using a first communication line that receives data from the first control unit and a second communication line that transmits data to the first control unit and thereby control a load based on an instruction from the first control unit, the communication method comprising:

transmitting a return to the first control unit by using the second communication line when receiving the instruction from the first control unit via the first communication line;

transmitting data to be held in a holding unit in the second control unit to the first control unit based on a set period via the second communication line when receiving the instruction to set to a specific mode from the first control unit via the first communication line; and;

determining, in the specific mode, at the timing for transmitting the data held in the holding unit based on the set period, if it is determined that it is the timing for transmitting the data held in the holding unit, determining whether or not it is in a first state of the reception of the instruction from the first control unit via the first communication line and whether or not it is in a second state of the return to the first control unit using the second communication line and if it is determined that it is neither in the first state nor in the second state, transmitting the data held in the holding unit, if it is determined that it is in the first state or in the second state, delaying a timing for transmitting the data so that the transmission of the data held in the holding unit so that the transmission of the data held in the holding unit is prevented from overlapping the transmission of the return.

7. A communication method according to claim 6, further comprising determining whether the instruction from the first control unit has been properly received via the first communication line, and returning a determination result.

8. A communication method according to claim 7, wherein the receiving the instruction from the first control unit comprises receiving the instruction including command data, data indicating an address in the holding unit, and cyclic redundancy check data, and wherein the determining comprises determining whether the instruction has been appropriately received, based on cyclic redundancy check data calculated from the received instruction and the cyclic redundancy check data included in the instruction.

9. A communication method according to claim 6, further comprising reading the data in the holding unit at the delayed timing.

10. A communication method according to claim 6, wherein the instruction from the first control unit includes a write instruction and a read instruction, wherein the write instruction includes a command indicating the write instruction, data indicating an address in the holding unit, data to be written at the address in the holding unit, and cyclic redundancy check data, wherein the read instruction includes a command indicating the read instruction, data indicating an address in the holding unit, dummy data, and cyclic redundancy check data, and wherein a bit length of the write instruction is equal to a bit length of the read instruction.

11. A communication method according to claim 6, wherein the holding unit holds data representing a state of the load.

* * * * *